United States Patent [19]

Okita et al.

[11] Patent Number: 4,651,240
[45] Date of Patent: Mar. 17, 1987

[54] DISK CARTRIDGE LOADING AND EJECTING MECHANISM IN A RECORDING AND PLAYBACK APPARATUS

[75] Inventors: Masao Okita, Furukawa; Kunihiko Gunji, Miyagi; Yukio Saito, Furukawa, all of Japan

[73] Assignee: Alps Electric Co., Ltd., Japan

[21] Appl. No.: 637,164

[22] Filed: Aug. 2, 1984

[30] Foreign Application Priority Data

Aug. 3, 1983 [JP] Japan .......................... 58-120211[U]

[51] Int. Cl.$^4$ ............................................ G11B 5/012
[52] U.S. Cl. ........................................ 360/97; 360/99
[58] Field of Search ...................... 360/97, 98, 99, 133, 360/96.5; 206/444; 369/261, 262, 270

[56] References Cited

U.S. PATENT DOCUMENTS

| 4,419,703 | 12/1983 | Gruczelak et al. | 360/97 |
| 4,479,210 | 10/1984 | Nakayama | 369/270 X |
| 4,562,498 | 12/1985 | Shibata | 360/99 X |
| 4,564,874 | 1/1986 | Schijven | 360/96.5 X |

FOREIGN PATENT DOCUMENTS

| 0082505 | 6/1983 | European Pat. Off. | 360/133 |
| 2105091 | 3/1983 | United Kingdom | 360/97 |

Primary Examiner—Robert S. Tupper
Assistant Examiner—Andrew L. Sniezek
Attorney, Agent, or Firm—Guy W. Shoup

[57] ABSTRACT

In a recording and playback apparatus for a disk cartridge, a loading lever is supported rotatably on a pair of sidewalls, and rotatable between a loading position which it takes when a disk cartridge is inserted into the apparatus and an ejecting position which it takes when the disk cartridge is ejected from the apparatus. A locking member is supported on one of the sidewalls rotatably into engagement with the loading lever to hold it in its ejecting position. A cam plate is also supported on the same sidewall reciprocally movably between its retracted position in which the loading lever is in its ejecting position and its advanced position in which the loading lever is in its loading position. The cam plate has an unlocking device which is engageable with the locking member to disengage it from the loading lever when the cam plate is moved to its advanced position. A locking spring is connected to the locking member for urging it into engagement with the loading lever. A tension spring is connected to the cam plate for urging it into its retracted position.

5 Claims, 7 Drawing Figures

Fig.1

Fig. 3 in # DISK CARTRIDGE LOADING AND EJECTING MECHANISM IN A RECORDING AND PLAYBACK APPARATUS

BACKGROUND OF THE INVENTION

1. Field of the Invention

This invention relates to a recording and playback apparatus for a disk cartridge.

2. Description of the Prior Art

Known recording and playback apparatuses for disk cartridges are complicated in construction and large in dimensions, as they include, for example, a complicated speed reduction mechanism which enables the insertion and ejection of a disk cartridge. They also have the disadvantage of being difficult to assemble accurately.

SUMMARY OF THE INVENTION

It is an object of this invention to provide a recording and playback apparatus for a disk cartridge which is simple in construction, small in size and easy to fabricate accurately.

This object is attained by a recording and playback apparatus for a disk cartridge which comprises a loading lever supported rotatably between a pair of sidewalls and normally urged to its loading position, a locking member supported on one of the sidewalls rotatably into engagement with the loading lever to hold it in its ejecting position, a cam plate supported on the same sidewall reciprocally movably between its retracted position in which the loading lever is in its ejecting position and its advanced position in which the loading lever is in its loading position, a locking spring connected to the locking member for urging the locking member into engagement with the loading lever, and a tension spring connected to the cam plate for urging it into its retracted position, the cam plate having an unlocking device which is engageable with the locking member to disengage it from the loading lever when the cam plate is brought to its advanced position.

The apparatus of this invention is simple in construction and small, since it does not require any complicated speed reduction mechanism of the type hitherto provided for enabling the loading and ejection of a disk cartridge. The apparatus is easy to fabricate accurately, since the cam plate having an unlocking device and the locking member for holding the loading lever in its ejecting position are both provided on one of the sidewalls and are, therefore, easy to place in their accurate positions relative to each other.

Other objects, features and advantages of this invention will become apparent from the following detailed description and the accompanying drawings.

BRIEF DESCRIPTION OF THE DRAWINGS

FIG. 1 is a top plan view of a magnetic recording and playback apparatus embodying this invention, and a disk cartridge which is going to be loaded into the apparatus;

FIG. 3 is a view similar to FIG. 2, but showing the apparatus in a different position;

DETAILED DESCRIPTION OF THE INVENTION

Figure 1:
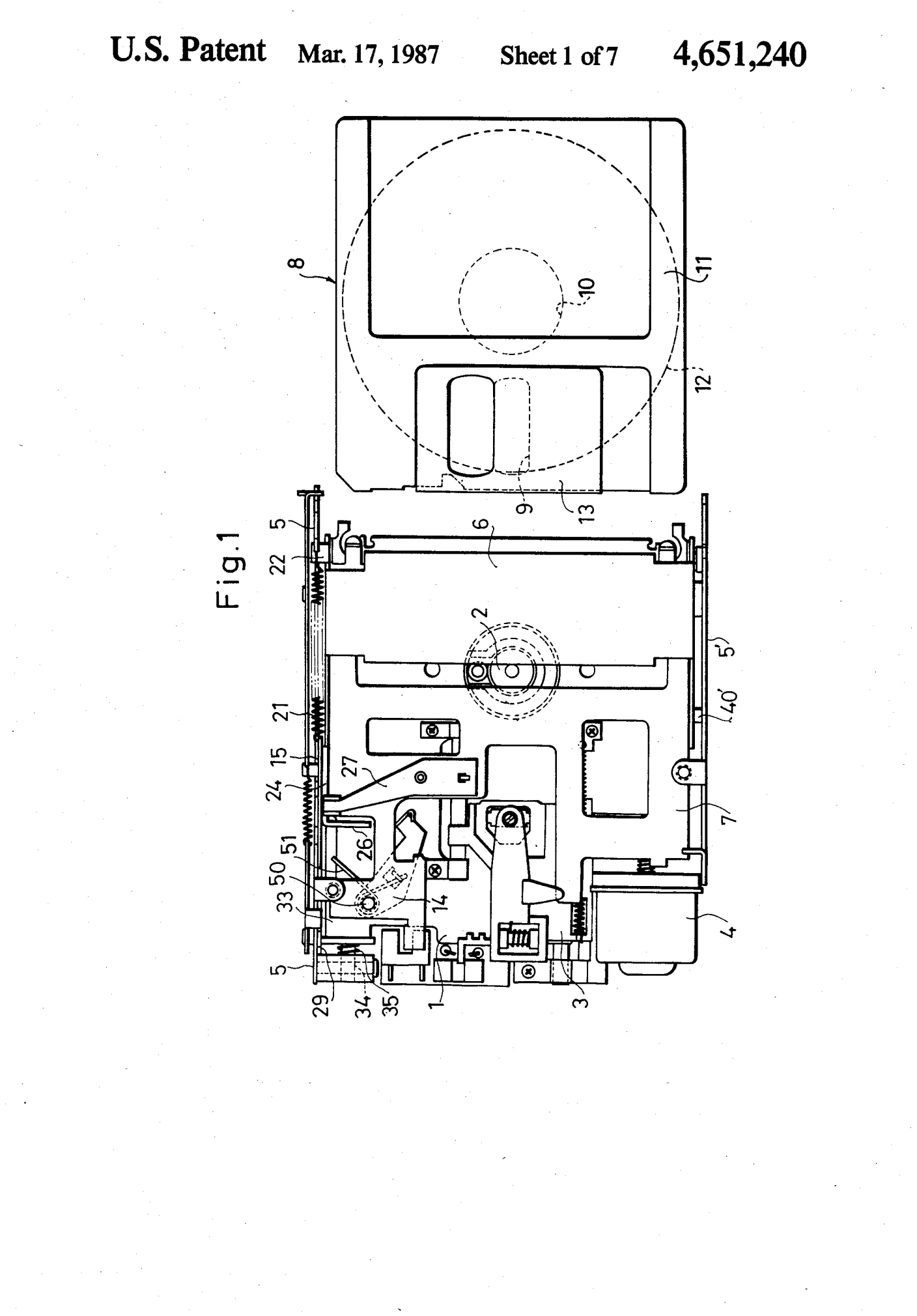
Figure 2:
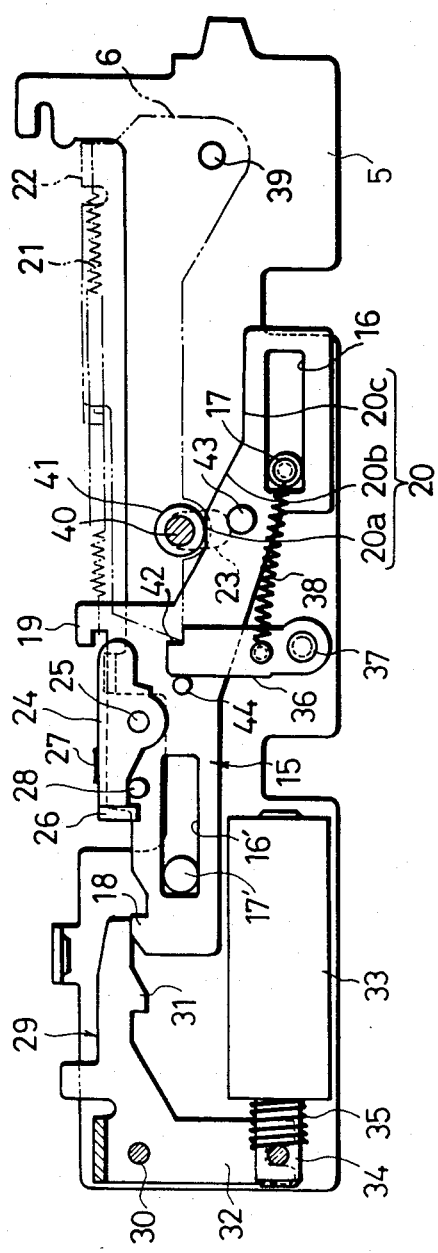
FIG. 2 is an enlarged side elevational view of the apparatus illustrating particularly the operation of a cam plate.

A magnetic recording and playback apparatus for a disk cartridge embodying this invention is generally shown in FIG. 1. It has a frame 1 supporting a disk rotating shaft 2, a carriage 3 carrying a magnetic head and a pad, and a stepping motor 4 for moving the carriage 3. A pair of sidewalls 5 and 5' are screwed to the opposite sides of the frame 1. A loading lever 6 and a cartridge holder 7 are provided between the sidewalls 5 and 5'. The cartridge holder 7 extends over the disk rotating shaft 2. The cartridge holder 7 has at its right end (FIG. 1) a cartridge inlet not shown, but provided for the loading and ejection of a disk cartridge 8. The disk cartridge 8 comprises a casing 11 formed from a hard synthetic resin and having an opening 9 for the magnetic head and an opening 10 for the disk rotating shaft 2, a magnetic disk 12 disposed rotatably in the casing 11, and a shutter 13 covering the opening 9. The cartridge holder 7 is provided between the carriage 3 and the sidewall 5 with an ejection lever 14 for opening the shutter 13 and storing a force for the ejection of the disk cartridge 8.

A cam plate 15 is longitudinally slidably supported on the inner surface of the sidewall 5. The sidewall 5 has two pins 17 and 17' and the cam plate 15 has two horizontally extending elongated holes 16 and 16' in which the pins 17 and 17' are respectively received so that the cam plate 15 may be reciprocally movable to a certain extent along the sidewall 5. The cam plate 15 has a latching projection 18 at one end thereof, a spring fastening projection 19 in its mid-portion and a cam surface 20 formed on the opposite side of the projection 19 from the projection 18. A tension spring 21 has one end fastened to the projection 19, while the other end of the spring 21 is fastened to a spring fastening projection 22 formed on the loading lever 6. The spring 21 urges the cam plate 15 toward the cartridge inlet and loading lever 6 to its loading position, as will hereinafter be described in further detail. The cam surface 20 has an upper horizontal portion 20a, a lower horizontal portion 20c and a slanting portion 20b therebetween. The sidewall 5 has a vertically elongated hole 23 provided in the vicinity of the cam surface 20, and the other sidewall 5' also has a similar hole aligned with the hole 23, but not shown.

The cam plate 15 is provided at the top of its mid-portion with a lever 24 which is rotatable about a shaft 25. The lever 24 has a folded end 26 on which the disk cartridge 8 is brought into abutment. A holding plate 27 formed from a leaf spring has one end secured to the top of the cartridge holder 7, while the other end of the holding plate 27 rests resiliently on the lever 24. The cam plate 15 has a projection defining a stop 28 which prevents downward rotation of the lever 24 beyond its horizontal position.

A locking lever 29 is rotatably supported by a pin 30 on the inner surface of the sidewall 5. The locking lever 29 has one end provided with a shoulder 31 which is engageable with the latching projection 18 on the cam plate 15. The locking lever 29 is provided at the other end thereof with a depending portion 32 having a lower end connected to an armature 34 projecting from an electromagnetic solenoid 33. A coiled spring 35 surrounds the armature 34 and normally urges the locking lever 29 in a direction which enables its shoulder 31 to be kept in engagement with the latching projection 18.

A locking member 36 is rotatably supported by a shaft 37 on the inner surface of the sidewall 5 in the vicinity of its mid-portion. A locking spring 38 extends between the pin 17 and the locking member 36 and normally urges the locking member 36 in a direction approaching the cartridge inlet.

Figure 4:
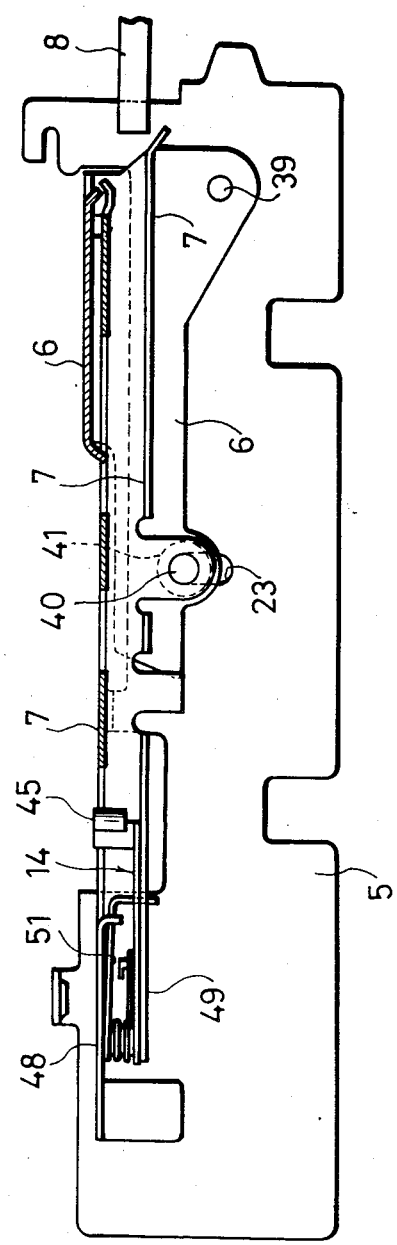
FIG. 4 is a side elevational view, partly in section, of the apparatus illustrating particularly the operation of a cartridge holder.
Figure 5:
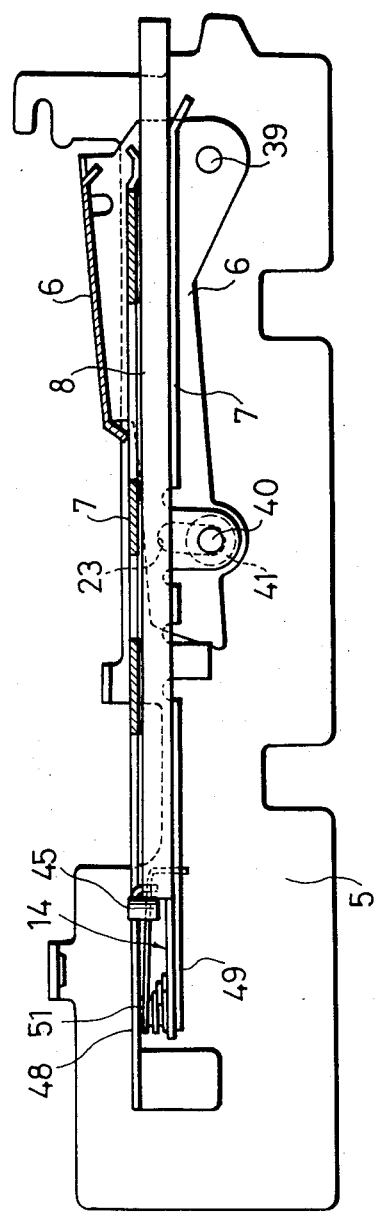
FIG. 5 is a view similar to FIG. 4, but showing the apparatus in a different position.

The loading lever 6 is rotatably supported by pins 39 on the sidewalls 5 and 5', respectively. The tension spring 21 normally urges the loading lever 6 in a downward direction to its loading position. The loading lever 6 and the cartridge holder 7 are rotatably connected to each other by pins 40 and 40' received in the holes 23 of the sidewalls 5 and 5', respectively, as shown in FIGS. 4 and 5. A roller 41 contacting the cam surface 20 is rotatably fitted on the pin 40. The loading lever 6 has an inner end with which a shoulder 42 provided at the top of the locking member 36 is engageable to prevent rotation of the loading lever 6 and maintain it and the cartridge holder 7 in their ejecting position. The cam plate 15 has an unlocking pin 43 which is adapted to abut on the locking member 36 to disengage its shoulder 42 from the loading lever 6. The cam plate 15 is also provided with another pin 44 on the opposite side of the locking member 36 from the unlocking pin 43 for bringing the shoulder 42 back into engagement with the loading lever 6.

Figure 6:
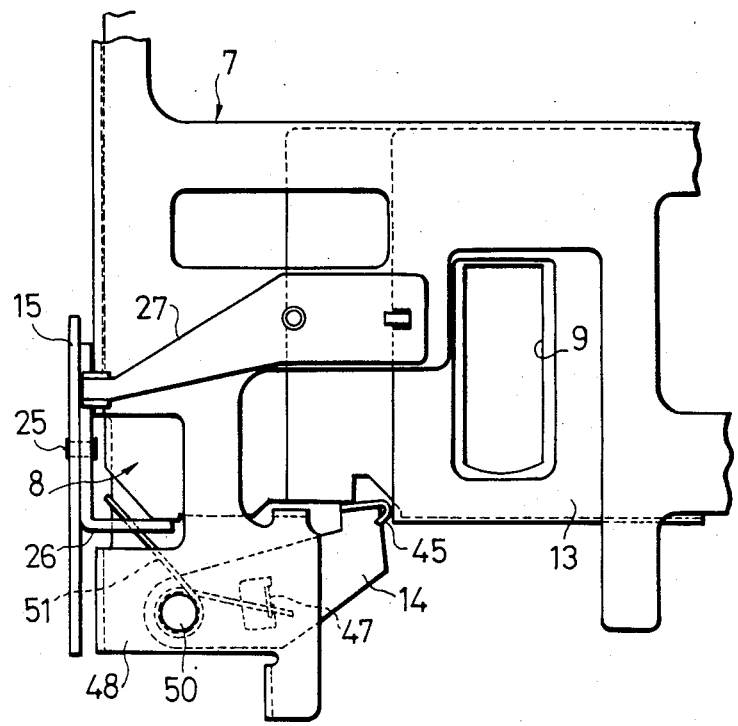
FIG. 6 is a fragmentary enlarged top plan view of the apparatus illustrating particularly the operation of an ejection lever.
Figure 7:
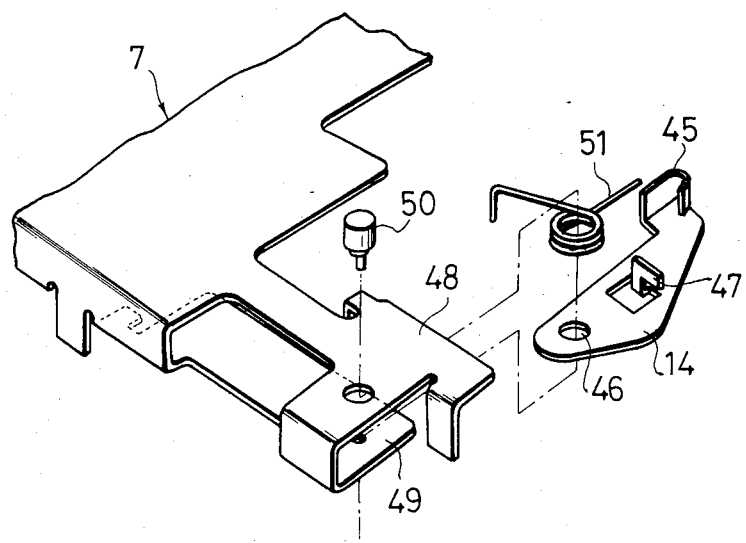
FIG. 7 is a fragmentary exploded perspective view of the apparatus showing the ejection lever and its vicinity.

The ejection lever 14 has a folded abutment projection 45 at one end, a hole 46 at the other end and a spring fastening projection 47 in its mid-portion, as shown in FIGS. 6 and 7. The ejection lever 14 is disposed between the top 48 and bottom 49 of the cartridge holder 7. The lever 14 is rotatably supported on the cartridge holder 7 by a shaft 50 secured thereto and extending loosely through the hole 46. A torsion spring 51 is fitted about the shaft 50 and has one end held by the projection 47 on the ejection lever 14, while the other end of the spring 51 is held by the bottom 49 of the cartridge holder 7. The spring 51 urges the ejection lever 14 in a position in which it is directed toward the cartridge inlet.

Prior to the insertion of the disk cartridge 8, the tension spring 21 maintains the cam plate 15 in its retracted position closer to the cartridge inlet, and the upper horizontal portion 20a of the cam surface 20 faces the hole 23 of the sidewall 5, as shown in FIG. 2. The roller 41 rests on the upper horizontal portion 20a and prevents downward rotation of the loading lever 6. The cartridge holder 7 is, therefore, held in its standby or ejecting position, as shown in FIG. 4.

Insofar as the solenoid 33 is not energized, the coiled spring 35 holds the locking lever 29 in abutment on the cam plate 15. As the cam plate 15 is in its retracted position, its latching projection 18 is out of engagement with the shoulder 31 on the locking lever 29. The loading lever 6 has its inner end resting on the shoulder 42 of the locking member 36 and is, therefore, held against downward rotation. The ejection lever has its free end directed toward the cartridge inlet as shown in FIG. 1. The leaf spring 27 has its free end resting on the lever 24 between the shaft 25 and the folded end 26 and holds the lever 24 against the stop 28, as shown in FIGS. 1 and 2.

If the disk cartridge 8 is inserted into the cartridge holder 7, the free end of the ejection lever 14 abuts on the edge of the shutter 13. Further insertion of the cartridge 8 causes the ejection lever 14 to rotate clockwise in FIG. 1 so that force may be stored in the torsion spring 51. The rotation of the ejection lever 14 causes the shutter 13 to open and expose the opening 9 for the magnetic head (see FIG. 6).

Figure 3:
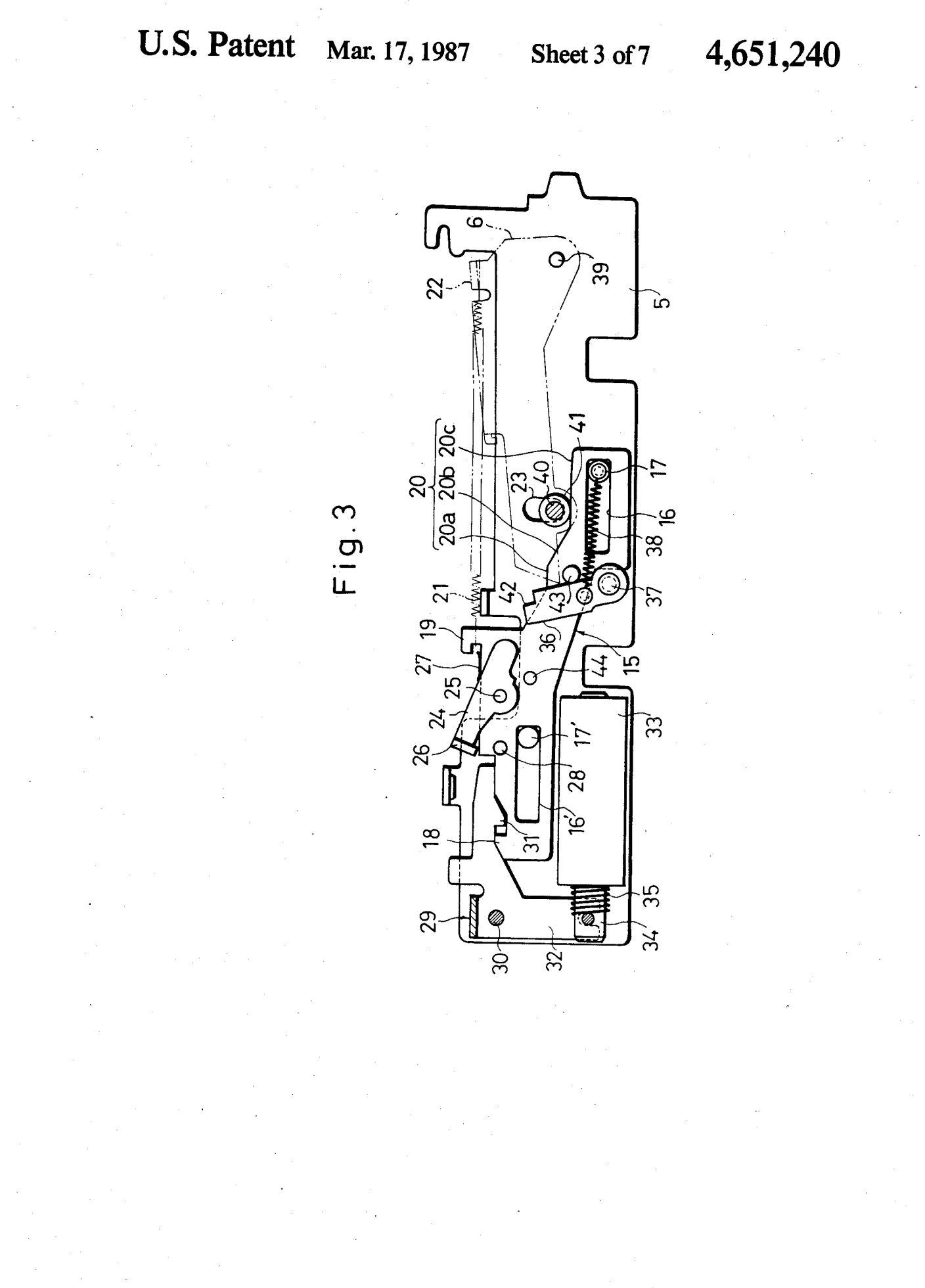

During the insertion of the disk cartridge 8, its inner end abuts on the folded end 26 of the lever 24 and moves the cam plate 15 toward the locking lever 29 by overcoming the force of the tension spring 21 until the latching projection 18 engages the shoulder 31. This engagement locks the cam plate 15 in its advanced position as shown in FIG. 3. This movement of the cam plate 15 causes the slanting portion 20b of its cam surface 20 to face the hole 23 of the sidewall 5, and when the cam plate 15 has been locked in its advanced position, approximately the lower end of the slanting portion 20b faces the hole 23. When the cam plate 15 has been locked in its advanced position, the inner end of the loading lever 6 still rests on the shoulder 42 of the locking member 36. This prevents downward rotation of the loading lever 6 and holds the cartridge holder 7, which is connected to the lever 6 by the pins 40 and 40', in its initial ejecting position as shown in FIG. 4. Therefore, the roller 41 is located in the upper portion of the hole 23 and away from the slanting portion 20b of the cam surface 20.

If the disk cartridge 8 is further inserted after the cam plate 15 has been locked in its advanced position, its unlocking pin 43 abuts on the locking member 36 and causes it to rotate counterclockwise by overcoming the force of the locking spring 38, as shown in FIG. 3. This rotation disengages the locking member 36 from the loading lever 6, and the tension spring 21 causes the lever 6 to rotate down about the pins 39 to its loading position. This rotation causes the lowering of the pins 40 and 40' and the roller 41 in the holes 23 and thereby the lowering of the cartridge holder 7 toward the disk rotating shaft 2 to place the disk cartridge 8 in position and make it ready for recording or playback. As the ejection lever 14 is supported on the cartridge holder 7, the cartridge holder 7, the disk cartridge 8 and the ejection lever 14 are lowered together. Therefore, there is no friction between the disk cartridge 8 and the ejection lever 14, but the disk cartridge 8 can be moved to its loading position smoothly. When the apparatus is loaded with the disk cartridge 8, the leaf spring 27 rests resiliently on the lever 24 in a location between the shaft 25 and the cartridge inlet. This and the lowering of the cartridge holder 7 causes the lever 24 to rotate about the shaft 25 clockwise in FIG. 2 and away from the inner end of the disk cartridge 8 as shown in FIG. 3. When the disk cartridge 8 has been loaded in position, the roller 41 rests on the lower horizontal portion 20c of the cam surface 20 as shown in FIG. 3.

Description will now be made of the ejection of the disk cartridge 8. If the solenoid 33 is energized in response to an ejection signal transmitted from a control system not shown, the armature 34 is pulled against the force of the coiled spring 35. The locking lever 29 is, therefore, rotated counterclockwise in FIG. 3 and its shoulder 31 is disengaged from the latching projection 18 on the cam plate 15, whereupon the cam plate 15 is brought back by the tension spring 21 toward the cartridge inlet to its retracted position. This movement of the cam plate 15 causes the roller 41 to rise along the slanting portion 20b of the cam surface 20 until it rides on the upper horizontal portion 20a as shown in FIG. 2. The loading lever 6 is rotated upwardly about the pins 39 against the force of the tension spring 21, and engaged again with the shoulder 42 on the locking member 36 which has been rotated back to its original position by the spring 38 and the projection 44 on the cam plate 15 as a result of the retraction of the cam plate 15. The cartridge holder 7 containing the disk cartridge 8 is raised from its loading position to its ejecting position. As the ejection lever 14 moves with the cartridge holder 7, there is no friction between the disk cartridge 8 and the ejection lever 14, but the disk cartridge 8 can be moved to its ejecting position smoothly. The rotation of the ejection lever 14 by the spring 51 and the retraction of the lever 24 resulting from the retraction of the cam plate 15 cause the disk cartridge 8 to be ejected from the cartridge holder 7. Upon ejection of the disk cartridge 8, a spring not shown closes the shutter 13 and thereby the opening 9 for the magnetic head, as shown in FIG. 1. The leaf spring 27 rests on the lever 24 between the shaft 25 and the folded end 26 and urges the lever 24 into abutment on the stop 28. The apparatus is now ready to receive another disk cartridge.

What is claimed is:

1. A recording and playback apparatus for a disk cartridge, comprising:
    (a) a forward end into or from which a disk cartridge is inserted or ejected;
    (b) a loading lever (6) having one end disposed toward the forward end of the apparatus pivotally mounted between a pair of side walls of the apparatus and having a distal end pivotable between an ejecting position and a loading position for ejecting and loading the disk cartridge in the apparatus;
    (c) a locking member (36) rotatably supported on one of said pair of side walls and having a locking end engageable with said distal end of said loading lever (6) for holding said loading lever in said ejecting position and rotatably disengageable from said distal end for allowing said loading lever to pivot to said loading position;
    (d) a cam plate (15) reciprocally movably along said one side wall between a forward position, corresponding to when said loading lever (6) is in said ejecting position, and a rearward position when said loading lever is in said loading position, said cam plate being resiliently urged into said forward position and movable rearwardly by abutting engagement with an end of a disk cartridge inserted in said apparatus, said cam plate having an unlocking member (43) engageable with said locking member 36 as said cam plate is moved rearwardly for disengaging said locking member from said distal end of said loading lever (6), said cam plate further having an inclined cam surface (20) for engaging a portion of said loading lever as said cam plate is moved to said forward position to return said loading lever to said ejecting position;
    (e) a locking spring (38) connected to said locking member (36) for biasing it toward engagement with said loading lever (6); and
    (f) a tension spring (21) connected to said cam plate (15) for urging it toward said forward position.

2. A recording and playback apparatus according to claim 1, further comprising a lock lever (29) rotatably supported on said one of said pair of side walls and engageable with said cam plate to hold it in said rearward position, and being rotatable upon energization of a solenoid to release said cam plate and allow it to return to said forward position under the urging force of said tension spring.

3. A recording and playback apparatus according to claim 1, further comprising an engaging lever (24) pivotably supported on said cam plate and having an end which is placed in abutting engagement with the end of a disk cartridge for moving said cam plate to said rearward position when the disk cartridge is inserted in said apparatus, said engaging lever being pivotable to disengage from the end of the disk cartridge when said cam plate is in said rearward position.

4. A recording and playback apparatus according to claim 3, further comprising a resilient member (27) mounted in a fixed position and bearing on a surface of said engaging lever (24) which is moved with said cam plate relative to said resilient member, in order to thereby pivot said engaging lever between abutting engagement with and disengagement from the end of the disk cartridge.

5. A recording and playback apparatus according to claim 1, wherein said tension spring (21) has one end fastened to said cam plate and the other end fastened to the forward end of said loading lever.

* * * * *